United States Patent

US006083290A

Ikeda et al.

[11] Patent Number: 6,083,290
[45] Date of Patent: Jul. 4, 2000

[54] INORGANIC MEDIA FOR DRY BARREL FINISHING

[75] Inventors: Yasushi Ikeda, Tajimi; Takao Ishida, Nishikasugai-gun, both of Japan

[73] Assignee: Sintobrator, Ltd., Nagoya, Japan

[21] Appl. No.: 09/128,997

[22] Filed: Aug. 4, 1998

[51] Int. Cl.$^7$ ............................... C09K 3/14; B24D 3/00; B24D 3/04

[52] U.S. Cl. .................................. 51/309; 51/307; 51/308; 501/126; 501/127; 501/130; 501/141

[58] Field of Search ............................... 51/307, 308, 309, 51/293; 501/141, 142, 143, 144, 126, 127, 130

[56] References Cited

U.S. PATENT DOCUMENTS

| | | | |
|---|---|---|---|
| 3,089,764 | 5/1963 | Smith-Gorman | 51/308 |
| 3,913,281 | 10/1975 | Jones | 51/308 |
| 5,049,166 | 9/1991 | Kirkendall | 51/308 |
| 5,443,603 | 8/1995 | Kirkendall | 51/308 |

*Primary Examiner*—Michael Marcheschi
*Attorney, Agent, or Firm*—Arent Fox Kintner Plotkin & Kahn, PLLC

[57] ABSTRACT

Inorganic media for barrel finishing produced by sintering a media green body formed from a mixed material comprising clay fine grains as a binder, abrasive grains and aluminum hydroxide fine grains as a brittleness imparting agent. The inorganic media is excellent in finishing performance, with which rough finishing can be conducted by dry barrel finishing.

12 Claims, 2 Drawing Sheets

INORGANIC MEDIA FOR DRY BARREL FINISHING

BACKGROUND OF THE INVENTION

1. Field of the Invention

The present invention relates to improved inorganic media for dry barrel finishing. The dry barrel finishing herein means barrel finishing using no water that is conducted for removing flushes, rounding edges, leveling and burnishing of an article to be finished. The inorganic media of the invention can be used in various barrel finishing apparatuses such as rotary barrel, vibration barrel, flow barrel and centrifugal barrel.

2. Description of Related Art

As media used in the dry barrel finishing (particles having abrasive power), those having an arbitrary shape, such as a sphere, a triangular pyramid and a triangular prism, in a size of from several millimeters to several tens millimeters have been used. The media generally comprise an abrasive compound assuming the abrasive power and a binder (matrix) maintaining the abrasive compound to substantially constitute the media. The media are roughly classified into three classes, organic media, metallic media and inorganic media, depending on the main component of the binder.

The organic media are generally obtained by mixing and heating an inorganic abrasive grains and a binder such as a polyamide resin, followed by forming, as described, e.g., in Examined Published Japanese Patent Application No. 6-55446. While the barrel finishing using the organic media causes less roughening of a finished surface due to their soft nature, they have a small specific gravity and small abrasive power. The organic media are thus used for intermediate finishing such as leveling.

The metallic media are composed of metal balls themselves, as described, e.g., in Unexamined Published Japanese Patent Application No. 60-180765. Since the metallic media do not contain an abrasive compound, substantially no abrasive power is expected. They are used for fine finishing (mirror finishing) such as polishing utilizing their function of crushing and leveling micro-projections on the surface of an article to be finished.

The inorganic media are formed by sintering a mixed material of abrasive grains such as alumina and an inorganic binder such as bauxite, as described, e.g., in Examined Published Japanese Patent Application No. 44-23873. Since the inorganic media are inexpensive and have large abrasive power, they are used for rough finishing. The rough finishing herein is the opposite of the fine finishing and includes flush removal and edge rounding.

In the wet barrel finishing, a mass composed of works (articles to be finished), media and abrasive water is filled in a finishing barrel, and the mass is fluidized by rotation, revolution or vibration of the barrel or rotation of a rotating plate equipped at the bottom of the barrel to conduct finishing. As a result of flow of the mass, flush removal, edge rounding, leveling or polishing is conducted by friction between the works and the media. The wet barrel finishing has a characteristic feature in that a large number of articles having a complicated shape can be treated at once, and it has been employed in production processes of a wide range of products. However, the wet barrel finishing requires disposalment of waste abrasive water, and there is a demand for making the waste water treatment easier.

In order to solve the above problem associated with the wet barrel finishing, various dry barrel finishing methods using no abrasive water have been proposed.

A dry barrel finishing is proposed in which a spindle oil or a fat and oil is used instead of abrasive water, as described, e.g., in Examined Published Japanese Patent Application No. 50-13994 and 57-57105. In this method, however, the oily component adhered on the articles to be finished must be removed when the following step is coating or plating. Thus, in this dry barrel finishing, waste water generates after washing the oily component, and as a result, a problem of waste water treatment arises.

Another dry barrel finishing is proposed in which no liquid material is added, as described, e.g., in Unexamined Published Japanese Patent Application No. 50-13994. However, the use of this finishing method is generally limited to final finishing such as polishing.

When rough finishing is conducted according to this dry barrel finishing using an inorganic media, the abrasive power (sharpness) of the inorganic media is soon decreased, and rough finishing cannot be stably conducted. The reason of the use of inorganic media is that the inorganic media has the largest abrasive power among the three types of media.

SUMMARY OF THE INVENTION

An object of the invention is to provide an inorganic media having excellent finishing performance for dry barrel finishing capable of conducting rough finishing.

The inorganic media of the invention is produced by sintering a media green body formed from a mixed material comprising clay fine grains as a binder, abrasive grains and aluminum hydroxide fine grains as a proper brittleness imparting agent.

A sintering agent may be added to the media green body. Examples of the sintering agent include at least one of iron oxide (II), iron oxide (III), manganese oxide (II), manganese oxide (III) and manganese oxide (IV). The sintering agent may be added in an amount of from 0 to 5% by weight based on the amount of the green body.

The characteristic feature of the invention resides in the point in that aluminum hydroxide is further added to and mixed with the conventional mixture of clay grains and abrasive grains, followed by sintering. As a result of the use of the composition to which aluminum hydroxide is added, the reduction in abrasive power due to the continuous dry barrel finishing is suppressed to increase wear of the media, in comparison to the conventional inorganic media. This is supported by the Examples described later.

While the function of aluminum hydroxide cannot be clearly concluded, it is considered as follows.

Aluminum hydroxide is converted to alumina as a result of dehydration decomposition at a temperature of from 200 to 300° C. to reduce its volume as a solid component, and hydroxyl groups escape into the air as water vapor. Based on this knowledge, the inventors have found that fine pores or cracks are generated in the course of sintering of the media due to the volume reduction of aluminum hydroxide and the escape of water vapor, and the fine pores or cracks remain after sintering.

The inorganic media is in a state owing to the presence of the fine pores or cracks, in which the media is suitably subjected to brittle fracture (cleavage fracture and grain boundary fracture). After repeated collision with articles to be finished in suitable times, the surface of the inorganic media is suitably peeled off to expose a non-worn abrasive material (abrasive grains) present inside the media. As a result, the reduction in abrasive power is suppressed.

DETAILED DESCRIPTION OF THE PREFERRED EMBODIMENTS

Figure 1:
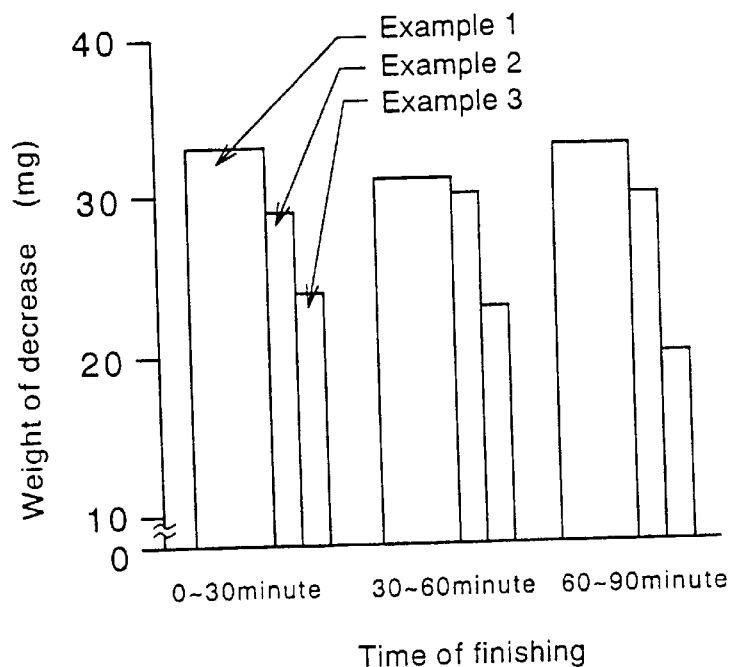
FIG. 1 is a graph showing the abrasive power of the Examples of the invention.

The inorganic media of the invention is produced by sintering a mixed material comprising clay grains, abrasive grains and aluminum hydroxide fine grains in the form of media grains. The percents used as a unit showing mixing ratio is percents by weight unless otherwise defined.

The clay grains used herein include an aggregate of fine water-containing silicate minerals generally having a grain diameter of from 0.01 to 0.002 mm or less, which exhibits plasticity by mixing with water and is sintered by baking. Specifically, kaolin, bentonite, woody clay, quartz-containing clay(shale clay) and agalmatolite can be used as the clay grains. The clay grains function as a binder (matrix), and general-purpose clay used for pottery and roof tiles having good miscibility with the abrasive grains and aluminum hydroxide can be used.

The abrasive grains are not particularly limited if they have miscibility with the clay grains, and general-purpose abrasive grains can be used. The abrasive grains having a grain size of #32 to #250 of Tyler mesh (0.495 to 0.061 mm opening) can be used. When the grain size is too small, rough finishing is difficult to be conducted. When the grain size is too large, the abrasive grains are liable to drop from the media on barrel finishing.

The abrasive grains may be natural materials or artificial materials, and materials generally called abrasive materials can be used. Examples of the natural materials include sandstone, corundum, emery, garnet, flint and diamond sand. Examples of the artificial materials include artificial corundum, synthetic diamond, various nitrides (boron nitride, aluminum nitride and titanium nitride) and various carbides (silicon carbide and boron carbide). Among these, White Alundum #100 (manufactured by Norton Co., artificial corundum (white aluminaous abrasive grains)) is particularly preferred.

Aluminum hydroxide is expressed by chemical formula $Al(OH)_3$. Not only alumina trihydrate ($Al_2O_3.3H_2O$) but also alumina monohydrate can be used.

In the case where there is a possibility that the brittleness of the media owing to aluminum hydroxide is too high, i.e., in the case where wear of the media proceeds too fast, the brittleness (easiness of cleavage) can be reduced by adding a sintering agent.

The sintering agent is a component to be added to accelerate sintering. The sintering agent forms a liquid phase at a sintering temperature, and enhances wetting of the grains to accelerate migration of the components. Specifically, iron oxides having a relatively low melting point ($FeO$, $Fe_2O_3$ and $Fe_3O_4$) and manganese oxide ($MnO$, $Mn_3O_4$, $Mn_2O_3$ and $MnO_2$) may be used.

The ratios of the components are decided depending on the desired characteristics, for example, whether maintenance of sharpness precedes or suppression of wear precedes, and generally can be as follows.

Clay grains (binder): about from 40 to 70%, preferably about from 45 to 60%

Abrasive grains: about from 15 to 45%, preferably about from 20 to 40%

Aluminum hydroxide: about from 5 to 45%, preferably about from 10 to 35%

Sintering agent: about from 0 to 5%, preferably about from 1 to 3%

In the above ratios, when the amount of the clay grains is too small, it is difficult to exhibit the role as a matrix (binder). When it is too large, the ratios of the abrasive agent and aluminum hydroxide become relatively small, to make difficult to maintain the power of rough finishing of the invention. When the amount of the abrasive grains is too small, it is difficult to reach the power of rough finishing of the invention.

When the amount of the abrasive grains is too large, the ratios of the binder and aluminum hydroxide become relatively small, to make difficult to attain the effect of the invention, i.e., maintenance of power of rough finishing for a long period of time.

When the amount of aluminum hydroxide is too small, it is difficult to supply the media with the suitable brittle fracture property, to make difficult to maintain the power of rough finishing of the invention for a long period of time. When the amount of aluminum hydroxide is too large, the brittleness fracture property becomes too high.

The sintering agent is appropriately added, and when the amount thereof exceeds 5%, it is difficult to prepare a media having a prescribed shape.

The inorganic media of the invention can be prepared by a process similar to that for an inorganic media for the conventional wet barrel finishing, i.e., a suitable granulation process corresponding to the shape (triangular pyramid, column, polygonal column, sphere and cone) selected depending on the object of finishing can be employed. Examples of the granulation process include rolling granulation, fluidized bed granulation, stirring granulation, press granulation, spray granulation and extrusion granulation. In the case of extrusion granulation, for example, the components in a powder form are weighed and mixed with each other, and mixed and kneaded with from 10 to 20% of water to form a slurry. The resulting slurry is put in an extruder and extruded to have the prescribed cross sectional form, followed by cut into the prescribed length.

The resulting green media are sintered at a temperature of from 1,000 to 1,500° C. for from 1 to 3 hours, preferably at a temperature of from 1,200 to 1,300° C. for from 1.5 to 2.5 hours. When the sintering temperature is too low, it is difficult to obtain a mechanical strength sufficient as media. The sintering temperature is too high, it is difficult to maintain the shape of media because of generation of thermal cracks.

The range of the suitable sintering temperature should be adjusted depending on the composition of the media. Accordingly, in the case where media having a new compositional constitution and/or a new shape are sintered, the suitable sintering temperature should be previously searched by conducting a sintering test of a test sample.

The inorganic media thus produced are put into a dry barrel finishing apparatus along with articles to be finished to conduct barrel finishing. On barrel finishing, the surface of the inorganic media is suitably peeled off to expose non-worn abrasive grains on the surface of the media, as described above. As a result, the inorganic media do not suffer from the reduction in the abrasive power with the lapse of time as in the conventional case, and the abrasive power of the inorganic media is maintained for a long period of time.

Description will now be made of a number of non-limiting examples and comparative examples in which tests were conducted to ascertain the advantages of the invention.

EXAMPLES 1 TO 3 AND COMPARATIVE EXAMPLES A TO C

In Examples 1 to 3, inorganic media of the invention were prepared where the mixing ratios of the clay fine grains, abrasive grains, aluminum hydroxide and a sintering agent were changed. In Comparative Examples A and B, inorganic media for the conventional wet barrel finishing and inorganic media for comparison were prepared respectively. The compositions of Examples and Comparative Examples are shown in Table 1.

TABLE 1

|  | Binder | Abrasive grains | | Aluminum | Sintering agent | |
|---|---|---|---|---|---|---|
|  | (Clay fine grains) | WA #120 | WA #240 | hydroxide | Manganese oxide (IV) | Iron oxide (III) |
| Example 1 | 50% | 24% | — | 24% | 2% | — |
| Example 2 | 48% | 24% | — | 24% | 2% | 2% |
| Example 3 | 50% | — | 40% | 10% | — | — |
| Comparative Example A | 75% | 25% | — | — | — | — |
| Comparative Example B | 72% | 25% | — | — | 3% | — |

As aluminum hydroxide, "Hydilite H031" manufactured by Showa Denko Co., Ltd. was used. Its chemical composition and properties obtained from the catalogue of the manufacturer are shown in Table 2.

TABLE 2

| Chemical Composition | | | | |
|---|---|---|---|---|
| $Al(OH)_3$ | $Fe_2O_3$ (%) | $SiO_2$ (%) | $Na_2O$ (%) | $w\text{-}Na_2O$ |
| 99.8 | 0.01 | 0.01 | 0.16 | 0.02 |
| Adhered water content (%) | Average grain size ($\mu$) | +75 $\mu$(%) | pH (30% slurry) | Specific surface area ($m^2/g$) |
| 0.10 | 18 | 0.02 | 9.3 | 1.4 |

As manganese oxide and ferric oxide for a sintering agent and clay fine grains for a binder, the following commercial products were used.

Manganese oxide (IV): "Manganese Dioxide 65" manufactured by Heiwa Chemicals Co., Ltd.

Iron oxide (III): "Ferric Oxide 85" manufactured by Heiwa Chemicals Co., Ltd.

Clay fine grains: "SB-83" manufactured by Maruo Ceramics Co., Ltd.

For the inorganic media of Examples and Comparative Examples, the raw materials in a powder form were mixed according to the formulation shown in Table 1, and about 15% of water was added thereto to form a slurry. The resulting slurry was put in an extruder to extrude with a circular cross section having a diameter of about 5 mm, and cut to a length of about 15 mm, followed by drying, to prepare green media. The green media was put in a heat resistant container and sintered at a temperature of from 1,200 to 1,300° C. for about 2 hours, to produce the intended inorganic media.

The resulting inorganic media for dry barrel finishing were actually used for dry barrel finishing. The results obtained are shown in FIGS. 1 to 4. Comparative Example C in FIGS. 2 and 4 was a result obtained by conducting the same dry barrel finishing with the use of resinous media (NVRT-10 manufactured by SintoBrator Ltd.) for comparison. In these experiments, 2 kg of stainless steel-made electronic parts in a cap form having a diameter of 12 mm and a height of 8 mm as works and 10 litters of the media were put in a dry flow barrel finishing apparatus (EVF-04D manufactured by SintoBrator Ltd.) to conduct dry barrel finishing. Five test pieces made of S45C having a diameter of 22 mm and a length of 15 mm were mixed with the articles to be finished on dry barrel finishing, and the abrasive power was obtained from the average of weight decrease of the test pieces.

Figure 2:
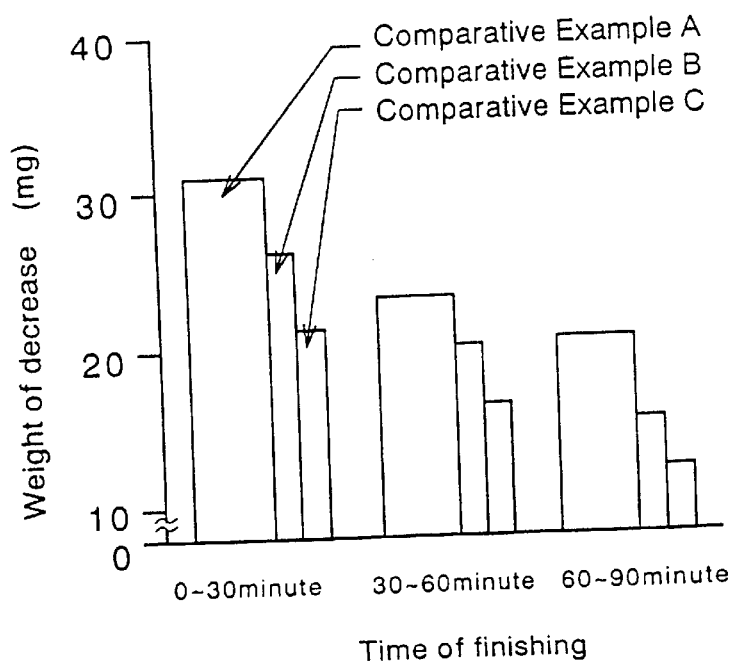
FIG. 2 is a graph showing the abrasive power of the Comparative Examples.

FIG. 1 is a graph showing the abrasive power of the Examples of the invention, and FIG. 2 is a graph showing the abrasive power of the Comparative Examples, in which the ordinate is the weight decrease of the articles to be finished on barrel finishing in 30 minutes, and the abscissa is passage of time from the start of finishing. According to the results shown in FIG. 2, Comparative Example A, a general-purpose inorganic media for wet barrel finishing, maintained high abrasive power of a weight decrease of 31 mg in the first 30 minutes immediately after the start of finishing, but the abrasive power was decreased to a weight decrease of 23 mg in the second 30 minutes (30 to 60 minutes after the start of finishing), and was further decreased to a weight decrease of 20 mg in the third 30 minutes (60 to 90 minutes after the start of finishing). The decreasing ratio of abrasive power in this case was about 35%.

On the other hand, according to the results shown in FIGS. 1 and 2, Example 1, in which 24% of aluminum hydroxide and 2% of manganese oxide were added, exhibited abrasive power of a weight decrease of 33 mg, which was only slightly larger than Comparative Example A. However, the abrasive power of Example 1 was stably maintained to a weight decrease of 33 mg even in the third 30 minutes (60 to 90 minutes after the start of finishing) with no reduction. It is understood that the addition of aluminum hydroxide and manganese oxide contributes improvement in stability of the abrasive power of the media.

In Example 2, in which 2% of ferric oxide was further added, the hardness of the media is slightly increased, and the abrasive power was slightly decreased accordingly. However, Example 2 did not suffer decrease in abrasive power with the lapse of time, and the abrasive power was stably maintained to a weight decrease of about 30 mg. Example 3, in which 10% of aluminum hydroxide and no sintering agent was added, exhibited abrasive power of a weight decrease of 24 mg in the first 30 minutes, whereas the abrasive power was gradually decreased to a weight decrease of 20 mg in the third 30 minutes (60 to 90 minutes after the start of finishing). However, the decreasing ratio of abrasive power in this case is only about 17%, and the addition of only 10% of aluminum hydroxide contributed the stability of the abrasive power of the media.

In comparison to Examples exhibiting stable finishing performance, Comparative Example B, in which 3% of manganese oxide was added but no aluminum hydroxide was added, exhibited a weight decrease of 26 mg in the first 30 minutes and 15 mg in the third 30 minutes (60 to 90 minutes after the start of finishing). The decreasing ratio of abrasive power in this case was as large as about 42%, and therefore the addition of only manganese oxide did not contribute the stability of the abrasive power. Comparative Example C, in which a commercially available resinous media was used, exhibited low abrasive power in the initial stage as a weight decrease of 21 mg in the first 30 minutes, and furthermore, the decreasing ratio of abrasive power was as large as about 43%. The resinous media thus could not be used for rough finishing.

Figure 3:
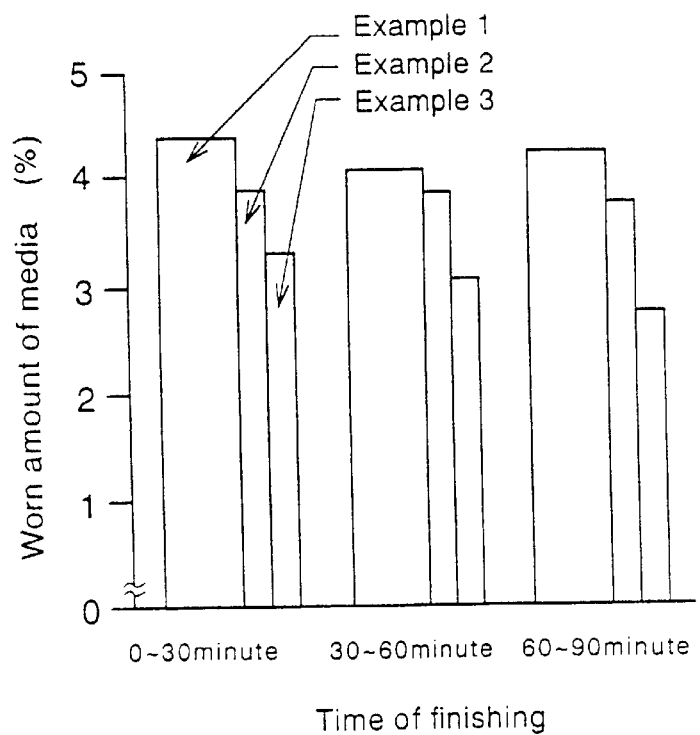
FIG. 3 is a graph showing the worn amount of the media of the Examples of the invention.
Figure 4:
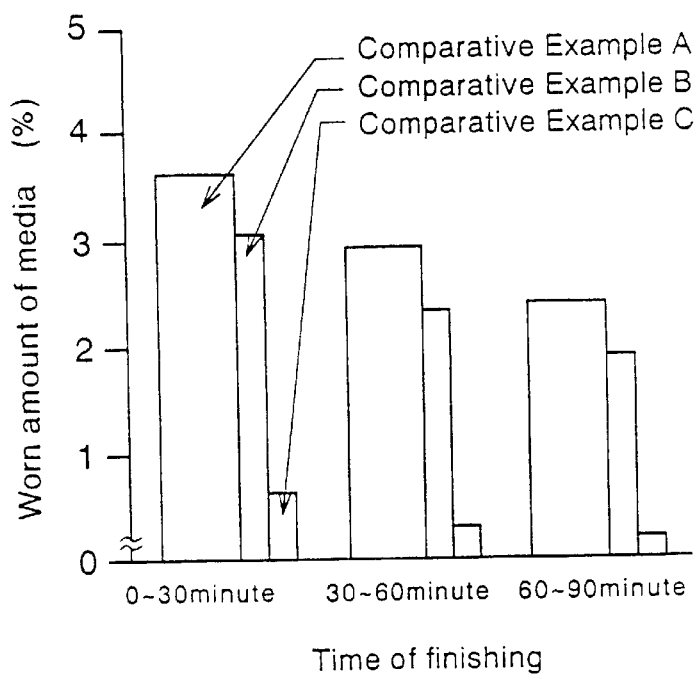
FIG. 4 is a graph showing the worn amount of the media of the Comparative Examples.

FIG. 3 is a graph showing the worn amount of the media of the Examples, and FIG. 4 is a graph showing the worn amount of the media of the Comparative Examples, in which the ordinate is the worn amount of the media in 30 minutes, and the abscissa is passage of time from the start of finishing. According to the results shown in FIGS. 3 and 4, the worn amounts of the media in 30 minutes in Examples were stable as similar to the abrasive power, where as those in Comparative Examples were unstable. It is understood that the addition of aluminum hydroxide contributes the stability of worn amount of the media. According to the results shown in FIGS. 3 and 4, the worn amount in Example 1 in the first 30 minutes was 4.4%, which was slightly larger than but was not abnormally larger than 3.6% in Comparative Example A. It is generally known that the abrasive power is proportional to the worn amount. The slight larger worn amount in Example 1 means that such a general relationship between the abrasive power and the worn amount can be applied to the case where aluminum hydroxide is added. Therefore, a larger amount of aluminum hydroxide is added when the abrasive power and its stability are important, whereas a smaller amount of aluminum hydroxide is added when the suppression of the worn amount is important. Accordingly, it is indicated that media suitable for the intended use can be produced by considering the addition amount of aluminum hydroxide as a factor of design.

What is claimed is:

1. Inorganic media for barrel finishing produced by sintering a media green body formed from a mixed material comprising clay fine grains as a binder, abrasive grains and aluminum hydroxide fine grains as a brittleness imparting agent.

2. Inorganic media for barrel finishing as claimed in claim 1, wherein said media green body further comprises a sintering agent.

3. Inorganic media for barrel finishing as claimed in claim 2, wherein said sintering agent is at least one selected from the group consisting of iron oxide (II), iron oxide (III), manganese oxide (II), manganese oxide (III) and manganese oxide (IV).

4. Inorganic media for barrel finishing produced by sintering a media green body formed from a mixed material comprising from 40 to 70% by weight of clay fine grains, from 15 to 45% by weight of abrasive grains, from 5 to 45% by weight of aluminum hydroxide fine grains and from 0 to 5% by weight of a sintering agent.

5. Inorganic media for barrel finishing as claimed in claim 4, wherein said mixed material comprises 45 to 60% by weight of clay fine grains, from 20 to 40% by weight of abrasive grains, from 10 to 35% by weight of aluminum hydroxide fine grains and from 1 to 3% by weight of a sintering agent.

6. Inorganic media for barrel finishing as claimed in claim 4, wherein said sintering agent is at least one selected from the group consisting of iron oxide (II), iron oxide (III), manganese oxide (II), manganese oxide (III) and manganese oxide (IV).

7. A process for making an inorganic media for barrel finishing, comprising the steps of:

mixing clay fine grains as a binder, abrasive grains and aluminum hydroxide fine grains as a brittleness imparting agent to form a mixed material;

forming a media green body from the mixed material; and sintering the media green body to form the inorganic media.

8. The process according to claim 7, wherein the mixing step further comprises mixing a sintering agent with the clay fine grains, abrasive grains and aluminum hydroxide fine grains to form the mixed material.

9. The process according to claim 8, wherein said sintering agent is at least one selected from the group consisting of iron oxide (II), iron oxide (III), manganese oxide (II), manganese oxide (III), and manganese oxide (IV).

10. The process according to claim 8, wherein 40 to 70% by weight of the clay fine grains, 15 to 45% by weight of the abrasive grains, 5 to 45% by weight of the aluminum hydroxide fine grains, and 0 to 5% by weight of the sintering agent are mixed to form the mixed material.

11. The process according to claim 10, wherein 45 to 60% by weight of the clay fine grains, 20 to 40% by weight of the abrasive grains, 10 to 35% by weight of the aluminum hydroxide fine grains, and 1 to 3% by weight of the sintering agent are mixed to form the mixed material.

12. The process according to claim 10, wherein said sintering agent is at least one selected from the group consisting of iron oxide (II), iron oxide (III), manganese oxide (II), manganese oxide (III), and manganese oxide (IV).

* * * * *